July 7, 1964 D. TANN 3,140,128
SELF-LUBRICATING BEARING
Filed May 10, 1961

INVENTOR
DAVID TANN
BY Lane & Aitken
ATTORNEYS

United States Patent Office 3,140,128
Patented July 7, 1964

3,140,128
SELF-LUBRICATING BEARING
David Tann, Detroit, Mich., assignor to Tann Corporation, Detroit, Mich., a corporation of Michigan
Filed May 10, 1961, Ser. No. 109,114
5 Claims. (Cl. 308—36.4)

This invention relates to sleeve bearings and particularly to a self-lubricating sleeve bearing that recirculates the lubricant therein. This application is a continuation in part of my copending application Serial No. 777,062, filed on November 28, 1958.

It is one object of the invention to provide a package bearing which is completely self-contained and ready to receive a shaft to be journaled directly therein.

It is another object of the invention to provide a self-contained package bearing having a built-in lubricant recirculating system for recirculating lubricant from a reservoir in the bearing to the surface of the shaft and then back into the reservoir.

It is a further object of the invention to provide a package bearing of the type described above having oil slingers floatingly positioned within the ends of the bearing in position to be press fit directly on the shaft to be journaled in the bearing.

It is a still further object of the invention to provide a package bearing of the type described above having an absolute minimum number of parts which are simple and economical to fabricate and assemble into a rugged and effective self-lubricating package bearing.

Further objects and features of novelty of the present invention will be specifically pointed out or will otherwise become apparent when referring, for a better understanding of the invention, to the following description taken in conjunction with the accompanying drawings, wherein.

Figure 1:
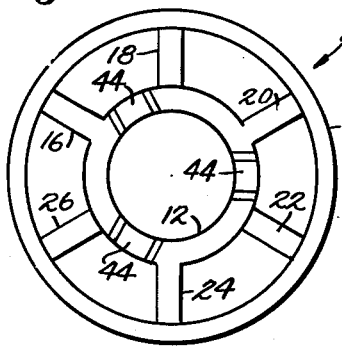
FIG. 1 is a front view of a spider type sintered bearing used in one embodiment of the present invention.
Figure 2:
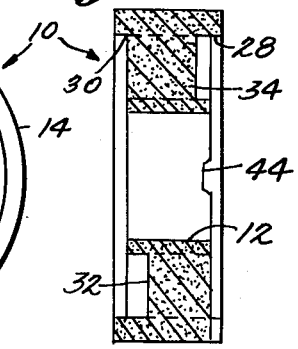
FIG. 2 is a sectional view of the structure illustrated in FIG. 1 taken along the line 2—2 thereof.

Referring to FIGS. 1 and 2, a sintered bearing 10 embodying features of the invention is illustrated which comprises an inner ring 12 and an outer ring 14 interconnected by a plurality of spider arms 16—26. The sintered bearing 10 is made by the well-known process of compressing a suitable powder metal or a mixture of powder metals, such as copper and tin, for example, to the desired shape in dies or presses and thereafter sintering the bearing into a strong, pure bronze that is porous enough to transmit lubricating oil therethrough.

Each end of the bearing is recessed as at 28 and 30 for a purpose which will be described hereinafter, and alternate ones of the spider arms are spaced axially inwardly from one or the other of the ends of the rings 12 and 14. For example, each of the arms 16, 20 and 24 is spaced inwardly as at 32 from the left end of the rings, as most clearly illustrated in FIG. 2, and each of the arms 18, 22 and 26 is spaced inwardly as at 34 from the right ends of the rings.

This enables a suitable wicking material impregnated with a bearing oil to be disposed in the spaces between the rings and the spider arms in a manner to permit communication between the wicking material in adjacent spaces. For example, wicking material disposed between the arms 16 and 18 would communicate with wicking material disposed between the arms 18 and 20 by virtue of the axial space 34 adjacent the arm 18 even when the ends of the bearing are enclosed, as illustrated in FIGS. 3 and 4, and wicking material between the arms 16 and 18 communicates with wicking material between the arms 16 and 26 by virtue of the axial space 32 adjacent to the arms 16.

Figure 3:
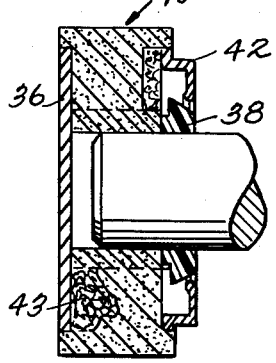
FIG. 3 is a sectional view similar to that of FIG. 2 with additional elements added to make a completely self-contained, self-lubricating package bearing for rotatably supporting the end of a shaft.

To make the spider bearing 10 into a completely self-contained, self-lubricating package bearing for journaling the end of a shaft 40 as illustrated in FIG. 3, a cover 36 is secured within the recess 30 to close off the left end of the bearing, and an oil slinger 38 is floatingly positioned at the right end of the bearing by an annular expansion plug or end cap 42 press fit within the recess 28 to prevent oil from escaping from the bearing 10 as will be described. It will be observed that the opening in the end cap 42 is smaller in diameter than the outside diameter of the oil slinger 38 and the outer end of the oil slinger projects into the opening so that the oil slinger is loosely retained in coaxial alignment with the inner ring 12 of the bearing 10.

The package bearing is completed by filling the spaces between each of the spider arms 16–26 with a suitable wicking material 43 which is thoroughly impregnated with oil for lubricating the shaft 40. When the shaft 40 is inserted through the oil slinger 38 into the bearing 10, the oil slinger will be press fit therein and rotate freely with the shaft. With this construction the rotation of the shaft will draw oil from the wicking material through the porous inner ring 12 to lubricate the surface of the rotating shaft. Oil spreading to the left, as illustrated in FIG. 3, is retained within the bearing by the cover 36, and oil moving to the right is stopped by the oil slinger 38 and thrown radially outwardly into the end cap 42, from which it is returned to the wicking material in the reservoir within the bearing between the inner and outer rings 12 and 14. A plurality of circumferentially spaced radially extending grooves 44 are formed in the right end face of the inner ring 12 and communicate with the space between selected pairs of arms to facilitate the radially outward movement of the oil by the oil slinger 38.

Figure 4:
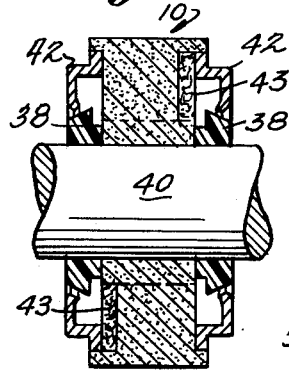
FIG. 4 is a sectional view similar to that of FIG. 3 illustrating a bearing for rotatably supporting a shaft extending completely therethrough.

In the embodiment illustrated in FIG. 4 another oil slinger 38 and end cap 42 are similarly positioned on the left end of the bearing 10 to provide a completely self-contained, self-lubricating package bearing for supporting a shaft intermediate the ends thereof. As in the embodiment of FIG. 3, each of the oil slingers 38 is floatingly positioned within the end caps 42 so that the shaft 40 can be inserted therethrough and through the central aperture of the bearing with the oil slingers press fitting against the shaft so as to rotate freely therewith after the shaft has been finally positioned. Each of the oil slingers is also preferably made of a suitable plastic low friction material, such as Teflon or nylon, so that they can function as thrust washers to resist light axial loading between the shaft and bearing 10. The left end face of the ring 12 is also preferably provided with a plurality of grooves similar to the grooves 44 to facilitate the radially outward movement of the oil by the rotating oil slinger. With either of the embodiments of FIGS. 3 and 4, a completely self-contained, self-lubricating package bearing is provided, with all of the elements necessary for recirculating the oil within the bearing prepositioned in the package. All that is necessary is to slip the shaft into position.

Figure 5:
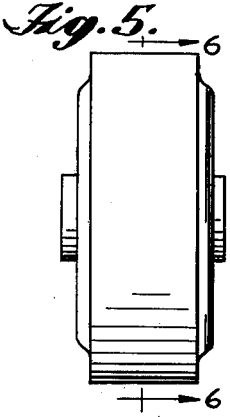
FIG. 5 is a side view illustrating another embodiment of the invention.
Figure 6:
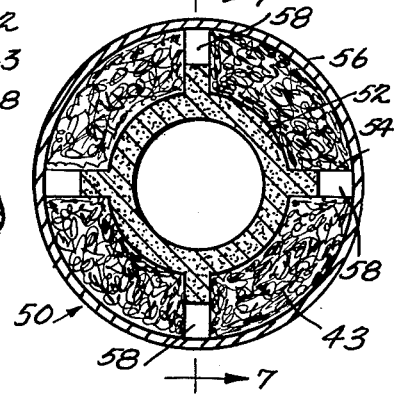
FIG. 6 is a sectional view of the structure illustrated in FIG. 5 taken along the line 6—6 thereof.
Figure 7:
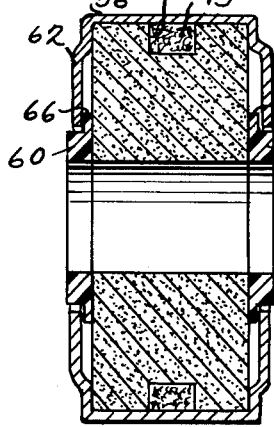
FIG. 7 is a sectional view of the structure illustrated in FIG. 6 taken along the line 7—7 thereof.

Referring to FIGS. 5 and 6, a further embodiment of the invention is illustrated which has fewer parts and is very rugged in construction. The package bearing 50 comprises a sintered ring 52 having a plurality of radially extending spider arms 54. A cylindrical housing 56, preferably made of sheet metal or the like, encircles the inner ring 52 and is supported on the ends of the arms 54 to define lubricant reservoirs between the arms which communicate with one another through notches 58 provided in the middle of the outer edge of each of the arms. An oil slinger 60 made of a suitable low friction material, such as Teflon, as previously mentioned, is positioned adjacent to each end of the bearing, and the ends 62 and 64 of the cylindrical housing 56 are rolled over as illustrated so as to overlap a radially outwardly presenting shoulder 66 on each of the oil slingers to floatingly position the oil slingers in coaxial alignment with the central aperture through the bearing, as previously described in connection with FIGS. 3 and 4, and function as the end caps 42. With this construction the package bearing can be very economically fabricated from four parts; the sintered ring 52, housing 56, and two oil slingers 60. Further, the cylindrical housing 56 adds strength to the construction and resistance against wear of the sintered material when the bearing 50 is inserted and removed from the aperture of the body or frame in which it is supported. The wicking material 43 can be positioned within the reservoir defined by the housing 56 before the housing is positioned and the ends thereof rolled over, or suitable aperture means (not shown) can be provided in the wall of the housing to enable the wicking material to be injected into the reservoir after the bearing has been completely fabricated. Reference is made to the Patent No. 2,966,459 issued to Martin L. Abel on December 27, 1960, for a detailed description of a preferred wicking material that can be injected into the lubricant reservoirs of each of the embodiments of the present invention.

Figure 9:
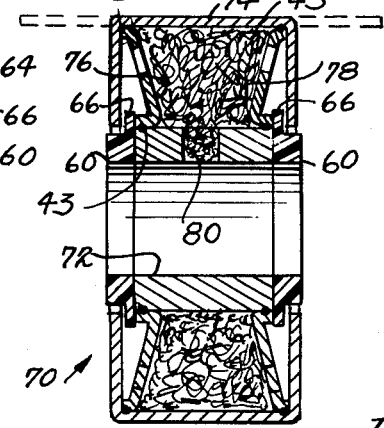
FIG. 9 is an enlarged sectional view of the structure illustrated in FIG. 8 taken along the line 9—9 thereof.
Figure 8:
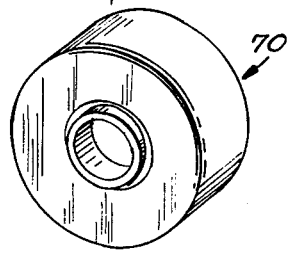
FIG. 8 is a perspective view illustrating a further embodiment of the invention.

Referring to FIGS. 8 and 9, a further embodiment of the invention is illustrated which is made up entirely of sheet metal components. The bearing 70 comprises a sheet metal bushing 72 having a sheet metal cylindrical housing 74 supported thereabout by a pair of washer-shaped sheet metal elements 76 and 78 at each end of the bearing, the radially inner and outer edges of each of the washer-shaped elements preferably being welded to the ends of the bushing and the cylindrical housing respectively. The ends of the housing, which are originally in the position illustrated in phantom in FIG. 8, are rolled over, after the washer-shaped elements 76 and 78 have been welded into position, to overlap the shoulders 66 on oil slingers 60 to floatingly position the oil slingers in the same manner as they were floatingly positioned in FIG. 5. The bushing 72 of the bearing 70 is provided with a window 80 intermediate the ends thereof to transmit lubricant from the wicking material 43 filling the reservoir within the bearing to the surface of the shaft to be journaled therein. If desired, suitable aperture means may be provided in the wall of the cylindrical housing 74 for injecting the wicking material into the reservoir, or the wicking material can be injected through the window 80.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. A self-lubricating package bearing comprising an outer race having a central aperture extending therethrough with a lubricant reservoir therein, said outer race being adapted to transmit lubricant from said reservoir to said aperture, an end cap secured to and supported by each end of said outer race, each of said end caps having an opening therein substantially coaxially aligned with said aperture, and an oil slinger floatingly positioned between each of said end caps and said outer race for limited radial movement relative thereto, each of said oil slingers having an outside diameter greater than the diameter of said opening in the end cap associated therewith and an inside diameter equal to the diameter of said aperture, said reservoir communicating with the annular space within the end caps surrounding said oil slingers.

2. The invention as defined in claim 1 including a lubricant impregnated wicking material filling said lubricant reservoir.

3. The invention as defined in claim 1 wherein the axial thickness of each of said oil slingers is greater than the axial distance between the end cap and end of the outer race on either side thereof, the outer end of each of said oil slingers having a reduced outside diameter projecting at least partially into the opening of the end cap associated therewith.

4. The invention as defined in claim 1 wherein said outer race comprises a one-piece body made of porous material.

5. The invention as defined in claim 1 wherein said outer race has a cylindrical surface portion concentric with the axis of said central aperture, said cylindrical surface portion defining the maximum outside diameter of the bearing.

References Cited in the file of this patent

UNITED STATES PATENTS

| | | |
|---|---|---|
| 2,407,807 | Bentley | Sept. 17, 1946 |
| 2,669,491 | Haller | Feb. 16, 1954 |
| 2,761,747 | Abel | Sept. 4, 1956 |
| 2,945,729 | Mitchell | July 19, 1960 |
| 2,964,363 | Daykin | Dec. 13, 1960 |